Figure 1:
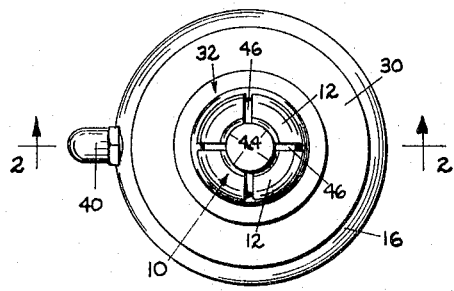

Dec. 20, 1966  C. D. GRAHAM  3,293,402
PNEUMATIC OPERATED WELDING STUD HOLDER
Filed Aug. 25, 1963

CHESTER D. GRAHAM
INVENTOR.
BY
BUCKHORN, BLORE, KLARQUIST & SPARKMAN
ATTORNEYS

United States Patent Office 3,293,402
Patented Dec. 20, 1966

3,293,402
PNEUMATIC OPERATED WELDING
STUD HOLDER
Chester D. Graham, Weymouth, Mass., assignor to Omark Industries, Inc., Portland, Oreg., a corporation of Oregon
Filed Aug. 5, 1963, Ser. No. 299,961
6 Claims. (Cl. 219—98)

The subject matter of the present invention relates in general to holding devices, and in particular to a welding stud holder which is operated by fluid pressure to grip a welding stud inserted into such holder and to release such stud for removal from the holder.

The stud holder of the present invention is especially useful as part of a welding apparatus to hold welding studs during welding of such studs to a workpiece. The stud holder includes a slotted stud collet positioned in a holder member with a flexible sleeve surrounding the collet and spaced from the wall of the holder member to provide a fluid tight chamber. Introduction of fluid under pressure into the chamber contracts the sleeve to force gripping fingers formed by the slots in the collet against a welding stud positioned within such chuck collet. The fluid pressure exerts a uniform force around the chuck collet so that its gripping fingers are each urged inwardly substantially the same distance to make firm mechanical and electrical contact with the welding stud. With conventional stud holders relying upon mechanical or spring pressure to grip the stud, the electrical contact is not always of sufficiently low resistance to prevent deleterious resistance heating due to flow of welding current through the junction between the holder and stud. The result is that the holders rapidly deteriorate. This is largely overcome by the present invention by reason of a more uniform electrical contact between the chuck jaws and the welding stud which is produced by fluid pressure. In addition, the stud holder of the present invention has an extremely simple structure which is inexpensive to manufacture and economical to operate. This simplified structure allows the chuck collet to be loaded manually or automatically with welding studs through either the front or the rear ends of such collet. Another advantage of the present stud holder is that it can be more easily loaded and unloaded due to reduced friction between the stud and collet during insertion and removal of the studs.

It is therefore one object of the present invention to provide an improved holding device.

Another object of the invention is to provide an improved stud holder which is operated by fluid pressure.

A further object of the invention is to provide an improved welding stud holder in which fluid pressure is employed to provide better mechanical and electrical contact between the welding stud and the stud chuck of such holder.

An additional object of the invention is to provide an improved welding stud holder of a simplified structure which enables the loading of welding studs through the front or rear ends of a chuck collet employed in such holder.

Still another object of the invention is to provide an improved welding stud holder which employs fluid pressure to give more uniform electrical contact between the welding stud and the chuck collet of such stud holder in order to provide a longer more useful life for such chuck collet.

A still further object of the present invention is to provide an improved welding stud holder which is inexpensive to manufacture and economical to operate and which is easier to load and unload.

Figure 2:
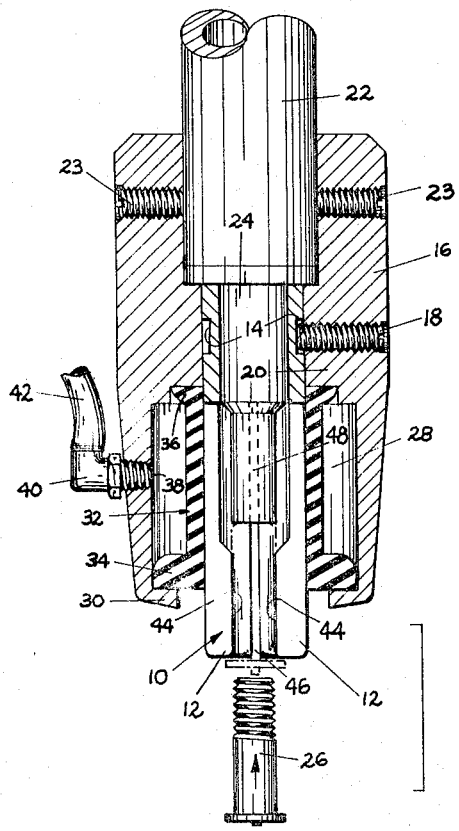
Figure 3:
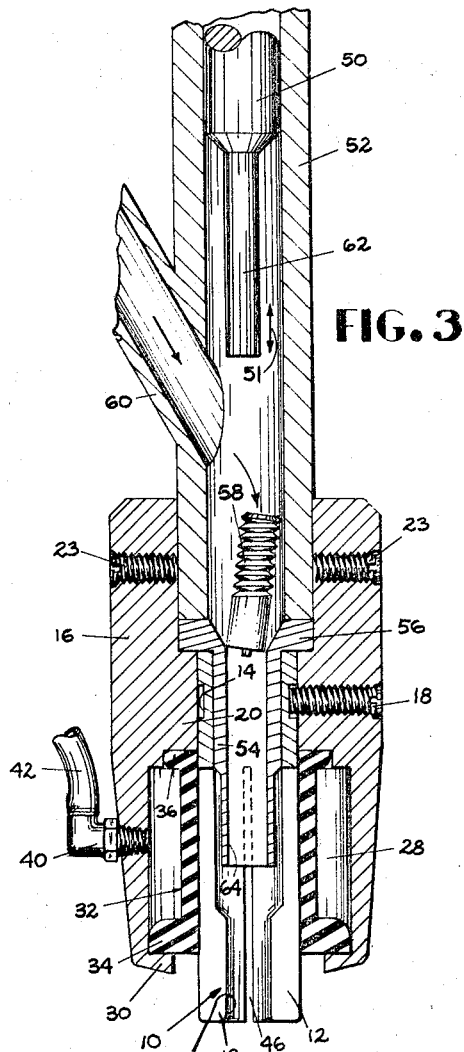

Other objects and advantages of the present invention will be apparent from the following detailed description of certain preferred embodiments thereof and from the attached drawings of which:

FIG. 1 is a front view of a preferred embodiment of the welding stud holder of the present invention, FIG. 2 is a horizontal section view taken along the line 2—2 of FIG. 1 showing the type of stud stop employed when the stud holder is front loaded, and FIG. 3 is a section view similar to FIG. 2 showing the additional apparatus necessary to load welding studs through the rear end of the stud holder of the present invention.

As shown in FIGS. 1 and 2, the welding stud holder of the present invention includes a chuck collet 10 in the form of a hollow, cylindrical sleeve having its front end split longitudinally into four identical resilient fingers 12 which function as the grip portions of the collet, while the rear end of the collet is provided with an annular notch 14 in the outer surface of such collet. The chuck collet 10 is attached to a chuck holder member 16 by means of a set screw 18 which is threaded through a hole in the side of the holder member into engagement with the bottom of the notch 14 in the collet. The rear end of the chuck collet is positioned inside the holder member adjacent an inwardly extending annular shoulder portion 20 of such holder member through which such set screw extends. The holder member 16 is secured to a shaft 22 by a pair of set screws 23 which extend through opposite sides of the rear end of the holder member into engagement with the shaft. Thus, the chuck collet 10 and the chuck holder 16 are moved together with the shaft 22 toward and away from the workpiece (not shown).

A stop member 24 is provided inside the holder member 16 of FIG. 2, with an annular outwardly extending flange at the rear end of the stop member in engagement with the shoulder portion 20 of the chuck holder and the rear end of the chuck collet 10 which serve as reference surfaces to accurately position the front end of such stop member with respect to such collet and such holder member. When a flanged welding stud 26 is inserted into the front end of the chuck collet 10, the rear end of such stud engages the front end of the stop member 24 to position such stud within such chuck collet so that the welding tip at the front end of such stud extends out of the chuck. Thus, the stud holder of the present invention may be modified to accept different length welding studs merely by replacing the stop member 24 with a different length stop member. It should be noted that the stop member 24 may be eliminated entirely from the front loaded stud holder of FIG. 2, if flanged welding studs are employed since the annular outward extending flange adjacent the tip of such stud can function as a stop surface to position the stud in the chuck collet 10 by engagement with the front end of the chuck collet. Alternatively, a stop cover sleeve (not shown) may be provided over the outside of the front end of the chuck collet 10 and the holder member 16, as described in copending United States patent application Serial No. 160,818, entitled Stud Welding Apparatus and Stud Stop Device Therefor, filed December 20, 1961, by Raymond V. Pomeroy, now Patent No. 3,119,008. Thus, it is only when non-flanged welding studs, such as that shown in FIG. 3, are employed that the stop member 24 is essential in the front loaded stud holder.

The grip fingers 12 of the chuck collet 10 of FIG. 2 are urged into engagement with the outer surface of the welding stud 26 by fluid pressure in a manner hereafter described to hold such stud within the chuck collet and to provide good electrical contact thereto. The holder member 16 is provided with a cylindrical cavity 28 into which a portion of the grip fingers 12 and the rear end of the collet extend through an opening in the front end of the holder member which is surrounded by an annular inwardly extending flange portion 30 of such holder member. A flexible seal sleeve 32 of plastic or rubber, such as neoprene, or other resilient compressible elastomer material is provided around the chuck collet 10 within the cavity 28. This cylindrical seal sleeve 32 is provided with a pair of annular, outwardly extending flange portions 34 and 36 at the front and rear ends thereof, respectively. The front flange portion 34 of the seal sleeve contacts the inner surface of the flange 30 at the front end of the holder member 16, while the rear flange portion 36 of such seal sleeve engages the inner surface of the shoulder 20 of such holder member. Thus, the sleeve 32 forms a chamber with the holder member between the chuck collet and such holder member.

An aperture 38 is provided through the wall of holder member 16 into the interior of cavity 28 at a position between the end flanges 34 and 36 of the seal sleeve so that it communicates with the chamber. An air fitting 40 is threaded into such aperture. This air fitting 40 may be in the form of a pipe elbow whose outer end is suitably secured to an air hose 42 which supplies air under pressure from a suitable source (not shown). When air is forced through hose 32 and aperture 38 into the cavity 28 within the holder member 16, the increase in air pressure within such cavity causes the flange portions 34 and 36 of the resilient seal sleeve 32 to be urged against the flange 30 and the shoulder 20 of the holder member in order to form an air-tight chamber between the holder member 16 and the chuck collet 10. Since the seal sleeve 32 is resilient, this air-tight chamber expands in volume due to the increased air pressure and causes the grip fingers 12 of the chuck collet 10 to be urged inward into engagement with the outer surface of the welding stud. The grip fingers 12 are provided with enlarged portions adjacent the front end of the collet 10 forming bearing surfaces 44 on the interior of the collet which contact the welding stud 26. However, in order to provide the grip fingers 12 with maximum resiliency so that they may be easily depressed by air pressure, the notches 46 forming such fingers extend from the front end of the collet 10 to a position adjacent the rear of the collet near the flange portion 36 of the seal sleeve. The stop member 24 is provided with a front portion 48 of reduced diameter to space such front portion from the grip fingers 12 in order to allow inward movement of such grip fingers due to increased air pressure.

FIG. 3 shows another embodiment of the welding stud holder of the present invention which is similar to the embodiment shown in FIG. 2, so that only the differences between these two embodiments will be described. The stud holder is rear loaded by means of a cylindrical ramrod 50 shown in its retracted position, which slides within a hollow shaft 52 attached to the rear of the holder member 16 by set screws 23. A tubular guide member 54 is inserted into the rear end of the chuck collet 10 in place of the stop member 24 of FIG. 2. This guide member has an annular, outward extending flange 56 at the rear end thereof which is held between the rear end of the collet 10 and the front end of the shaft in contact with the shoulder portion 20 of the holder member 16. A conical tapered aperture is provided in the rear end of the guide member 54 through the flange 56 to allow the transmission of non-flanged welding studs 58 from within the hollow shaft 52 through the guide member 54 into the chuck collet 10 where they are held by the bearing surfaces 44 of the grip fingers 12. The welding stud 58 is fed into the hollow shaft 52 through an aperture in the side of the shaft by means of a feed tube 60 suitably supported at an acute angle with respect to the side of such shaft. After the welding studs are properly oriented, they are allowed to fall front end first by gravity down through the feed tube 60 into the hollow shaft 52.

The ramrod 50 may be actuated by a hydraulic cylinder (not shown) so that such ramrod moves downward a fixed distance in the direction of arrows 51 into contact with the rear end of the welding stud 58 and pushes such stud through the guide member 54 into the rear of the chuck collet 10. It should be noted that the ramrod 50 is provided with a front portion 62 of reduced diameter which fits within the guide member 54 and whose end surface serves as a stop to accurately position the welding stud 58 within the collet 10. Thus, the length of the front portion 62 of the ramrod 50 must be varied by replacement of the ramrod to accommodate different length welding studs if the ramrod is driven down the same distance each time. However, it is also possible to vary the displacement of the ramrod 50 in order to compensate for different length welding studs. It should be noted that the front end 64 of the guide member 54 is provided with a reduced wall thickness in order to space the guide member from the grip fingers 12 of the chuck collet so that such grip fingers may flex inward when air pressure is exerted on the seal sleeve 32 by means of the air hose 42.

In either embodiment of the stud holder of the present invention, the seal sleeve 32 forms an air-tight chamber between the chuck collet 10 and the holder member 16 so that when air is transmitted into this chamber through the air hose 42 a uniform pressure is exerted on the inner surface of the chamber including resilient sleeve 32 causing such sleeve to move substantially solely inwardly and compress the chuck jaws or fingers 12 inward into contact with the stud. This pressure causes a uniform force to be exerted upon the grip fingers 12 of the chuck collet since such fingers have substantially the same surface area. Thus, the fluid pressure produces an extremely good electrical and mechanical contact between the bearing surfaces 44 of the grip fingers 12 and the welding stud, because such fingers have substantially the same thickness and resiliency characteristics and urged inwardly substantially the same distance by the resultant force. As has been discussed previously, good uniform electrical contact is essential if the chuck collet 10 is to have a long useful life and if the welding stud is to be properly welded to the workpiece.

It will be obvious to those having ordinary skill in the art that various changes may be made in the details of the above-described embodiments of the present invention. For example, other types of fluids may be employed to exert pressure onto the seal sleeve 32 including liquids such as oil and gases other than air. Therefore, the scope of the present invention should only be determined by the following claims.

I claim:
1. A welding stud holder, comprising:
   a stud chuck having a passageway extending completely therethrough with one end of said chuck being split longitudinally into a plurality of separate resilient grip portions so that welding studs inserted into said passageway are held therein by frictional engagement with said grip portions;
   a chuck holder member with a cavity therein for the reception of said chuck, said holder member being attached to said chuck with the grip portions thereof positioned at least partially within said cavity and having an aperture extending from the exterior of said holder member into said cavity;
   sealing means including a tubular sleeve of elastomer material positioned around the grip portions of said chuck in said cavity and having a pair of sealing flange portions at the opposite ends thereof to form an air-tight chamber with said holder member between said holder member and said chuck, for moving said grip portions inward by substantially solely inward movement of said sleeve when the air pressure within said chamber is increased; and means for forcing air into said chamber through the aperture in said holder member to raise the air pressure in said chamber to urge the resilient grip portions of said chuck inward into engagement with a welding stud positioned in the passageway of said chuck to prevent movement of the stud with respect to said chuck, and for removing at least a portion of said air from said chamber to lower the air pressure in said chamber so that said welding stud can be removed from said chuck.

2. A welding stud holder, comprising:

a stud chuck having a passageway extending completely therethrough with one end of said chuck being split into a plurality of separate resilient grip portions so that welding studs inserted into said passageway are held therein by frictional engagement with said grip portions;

a chuck holder member with a cavity therein for the reception of said chuck, said holder member being attached to said chuck with the grip portions thereof positioned at least partially within said cavity and having an aperture extending from the exterior of said holder member into said cavity;

seal means including a tubular sleeve of resilient compressible material positioned around the grip portions of said chuck in said cavity to form a fluid-tight chamber between said holder member and said chuck, for moving said grip portions radially inward by inward movement of said sleeve when the fluid pressure in said chamber is increased;

means for forcing fluid into said chamber through the aperture in said holder member to raise the fluid pressure in said chamber to urge the resilient grip portions of said chuck inward into engagement with a welding stud positioned in the passageway of said chuck to prevent movement of the stud with respect to said chuck, and for removing at least a portion of said fluid from said chamber to lower the fluid pressure in said chamber so that said welding stud can be removed from said chuck; and adjustable stop means extending through the rear end of said chuck into said passageway for positioning the welding stud in said passageway so that the front end of said stud extends a predetermined distance out of the front end of said chuck for proper welding operation.

3. A welding stud holder, comprising:

a stud chuck having a passageway extending completely therethrough with one end of said chuck being split longitudinally into a plurality of separate resilient grip portions so that welding studs inserted into said passageway are held therein by frictional engagement with said grip portions;

a chuck holder member with a cavity therein for the reception of said chuck, said holder member being attached to said chuck with the grip portions thereof positioned at least partially within said cavity and having an aperture extending from the exterior of said holder member into said cavity;

seal means including a tubular sleeve of resilient compressible material positioned around the grip portions of said chuck in said cavity to form a fluid-tight chamber between said holder member and said chuck;

means for forcing fluid into said chamber through the aperture in said holder member to raise the fluid pressure in said chamber to urge the resilient grip portions of said chuck inward into engagement with a welding stud positioned in the passageway of said chuck to prevent movement of the stud with respect to said chuck, and for removing at least a portion of said fluid from said chamber to lower the fluid pressure in said chamber so that said welding stud can be removed from said chuck; and a stop member having a shaft portion extending through the rear end of said chuck and positioned within the passageway of said chuck so that said shaft portion engages the rear end of the welding stud in said passageway to position the front end of the stud so that it extends a predetermined distance out of the front end of said chuck for proper welding operation.

4. A welding stud holder, comprising:

a stud chuck having a passageway extending therethrough with one end of said chuck being split longitudinally into a plurality of separate resilient grip portions so that welding studs inserted into said passageway are held therein by frictional engagement with said grip portions;

a chuck holder member with a cavity therein for the reception of said chuck, said holder member being attached to said chuck with the grip portions thereof positioned at least partially within said cavity and having an aperture extending from the exterior of said holder member into said cavity;

a flexible, cylindrical sleeve seal member of resilient compressible material having a pair of annular, outwardly extending flanges at the opposite ends thereof, positioned around the grip portions of said chuck in said cavity with said flanges engaging said holder member on opposite sides of said aperture to form a fluid-tight chamber with said holder member between said holder member and said chuck;

means for forcing fluid into said chamber through the aperture in said holder member to raise the fluid pressure in said chamber to urge the resilient grip portions of said chuck inward into engagement with a welding stud positioned in the passageway of said chuck to prevent movement of the stud with respect to said chuck, and for removing at least a portion of said fluid from said chamber to lower the fluid pressure in said chamber so that said welding stud can be removed from said chuck; and rear loading means for inserting a welding stud through an opening in the rear end of said chuck into said passageway and for positioning the welding stud in said passageway so that the front end of said stud extends a predetermined distance out of the front end of said chuck for proper welding operation.

5. A welding stud holder, comprising:

a stud chuck having a passageway extending therethrough with one end of said chuck being split longitudinally into a plurality of separate resilient grip portions so that welding studs inserted into said passageway are held therein by frictional engagement with said grip portions;

a chuck holder member with a cavity therein for the reception of said chuck, said holder member being attached at an inwardly extending shoulder portion to said chuck with the grip portions thereof positioned at least partially within said cavity, and having an aperture extending from the exterior of said holder member into said cavity;

a flexible, cylindrical sleeve seal member of resilient compressible material having a pair of annular, outwardly extending flanges at the opposite ends thereof positioned around the grip portions of said chuck in said cavity with said flanges engaging said holder member on opposite sides of said aperture to form a fluid-tight chamber with such holder member between said holder member and said chuck;

means for forcing air into said chamber through the aperture in said holder member to raise the air pressure in said chamber to urge the resilient grip portions of said chuck inward into engagement with a welding stud positioned in the passageway of said chuck to prevent movement of the stud with respect to said chuck, and for removing at least a portion of said air from said chamber to lower the air pressure in said chamber so that said welding stud can be removed from said chuck;

a stop member having a shaft portion positioned within the passageway of said chuck so that said shaft portion engages the rear end of the welding stud in said passageway, and having a flange portion which engages the rear end of said chuck to position the front end of the stud so that it extends a predetermined distance out of the said chuck for proper welding operation; and means for holding said stop member in said chuck, and for moving said holder member and said chuck together relative to a workpiece.

6. A welding stud holder, comprising:

a plurality of gripping elements adapted to hold a welding stud by frictional engagement therewith;

a holder member having a cavity therein containing at least a portion of each of said gripping elements and having an aperture extending through the wall of said holder member from the exterior of said holder member into said cavity;

seal means including a tubular sleeve of elastomer material having sealing flange portions and forming a fluid-tight chamber with said holder member between said holder member and said gripping elements within said cavity, for moving said gripping elements together by substantially solely inward movement of said sleeve when the fluid pressure within said chamber is increased; and means for forcing fluid into said chamber through the aperture in said holder member to increase the fluid pressure in said chamber and to urge the gripping elements into engagement with a stud positioned between said gripping elements in order to prevent movement of the stud with respect to the gripping elements and to provide good electrical contact between said stud and said gripping elements, and for removing at least a portion of said fluid from said chamber to lower the fluid pressure in said chamber so that the stud can be removed from said stud holder.

References Cited by the Examiner

UNITED STATES PATENTS

| | | | |
|---|---|---|---|
| 2,462,882 | 3/1949 | Martin | 219—98 X |
| 2,534,527 | 12/1950 | Myers | 279—4 |
| 2,537,989 | 1/1951 | Graham | 219—78 |
| 2,610,278 | 9/1952 | Graham | 219—98 |
| 2,673,227 | 3/1954 | Hubert | 13—16 |
| 2,920,895 | 1/1960 | Krouse | 279—41 X |

RICHARD M. WOOD, *Primary Examiner.*

R. F. STAUBLY, *Assistant Examiner.*